US012561545B2

(12) United States Patent
Heidari

(10) Patent No.: US 12,561,545 B2
(45) Date of Patent: Feb. 24, 2026

(54) METHOD AND DEVICE FOR ACTIVATING A CHIPCARD

(71) Applicant: Giesecke+Devrient ePayments America, Inc., Twinsburg, OH (US)

(72) Inventor: Mehdi Zadeh Heidari, Maple (CA)

(73) Assignee: Giesecke+Devrient ePayments America, Inc., Twinsburg, OH (US)

( * ) Notice: Subject to any disclaimer, the term of this patent is extended or adjusted under 35 U.S.C. 154(b) by 0 days.

(21) Appl. No.: 18/883,894

(22) Filed: Sep. 12, 2024

(65) Prior Publication Data

US 2025/0094758 A1     Mar. 20, 2025

(30) Foreign Application Priority Data

Sep. 15, 2023    (WO) .................. PCT/EP2023/075541

(51) Int. Cl.
*G06K 19/073* (2006.01)
*G06K 7/00* (2006.01)
*G06K 19/07* (2006.01)

(52) U.S. Cl.
CPC ......... *G06K 19/073* (2013.01); *G06K 7/0008* (2013.01); *G06K 19/0723* (2013.01)

(58) Field of Classification Search
CPC ........................... G06K 19/073; G06K 7/0008
See application file for complete search history.

(56) References Cited

U.S. PATENT DOCUMENTS

| | | | |
|---|---|---|---|
| 6,298,336 B1 | 10/2001 | Davis et al. | |
| 11,836,232 B1 * | 12/2023 | Durairaj ............... | G06V 40/172 |
| 2004/0236819 A1 | 11/2004 | Anati et al. | |
| 2011/0140841 A1 * | 6/2011 | Bona ................ | G06K 19/06196 |
| | | | 340/5.83 |
| 2018/0025349 A1 | 1/2018 | Marsh | |
| 2020/0126063 A1 | 4/2020 | Winkelmann | |
| 2020/0394641 A1 * | 12/2020 | Omojola ................. | G07F 7/086 |
| 2022/0417119 A1 * | 12/2022 | Sandridge ............. | H04L 63/102 |

FOREIGN PATENT DOCUMENTS

WO        2015114460 A2     8/2015

* cited by examiner

*Primary Examiner* — Allyson N Trail
(74) *Attorney, Agent, or Firm* — LNK LAW, PLLC

(57) ABSTRACT

A method for activating a chipcard includes: assigning a unique identifier to the chipcard; assigning the unique identifier to a chipcard record assigned to a designated holder of the chipcard; detecting the unique identifier by a personal device of the card holder; sending, by the personal device, an activation request of the chipcard to an activation server; sending, by the activation server, activation information and request to a chipcard issuer server; activating, by the chipcard issuer server, the chipcard; sending, by the chipcard issuer server, an activation response to the activation server; and sending, by the activation server, an activation confirmation to the personal device. A personal device is described that initiates steps for activating a chipcard.

14 Claims, 2 Drawing Sheets

METHOD AND DEVICE FOR ACTIVATING A CHIPCARD

CROSS REFERENCE TO RELATED APPLICATIONS

This application claims priority to International Patent Application No. PCT/EP2023/075541 filed on Sep. 15, 2023, the entire disclosure of which is incorporated herein by reference.

TECHNICAL FIELD

The description relates to a method for activating a chipcard and a personal device that is configured to initiate an activation process for activating a chipcard.

TECHNICAL BACKGROUND

Chipcards can be used by a card holder to access services provided by a service provider. Generally speaking, a chipcard is used by the card holder to indicate that the card holder is allowed to access a service. For example, a chipcard may be a bank card that can be used to make payments. Typically, in addition to the chipcard, the card holder is required to prove authorization by entering a password before access to the service is granted.

Besides bank cards, other examples of chipcards are subscriber identity module cards (SIM-cards) for accessing mobile communication networks, identity documents that are equipped with an electronic circuit for enabling access to electronic services provided by public or private organizations, or the like.

When a chipcard is requested by a designated card holder, the chipcard is prepared for usage by the chipcard issuer and is shipped to the card holder. Before the chipcard can be used by the card holder to access services, the chipcard requires activation. In other words, the chipcard issuer activates the chipcard for accessing services upon request of the card holder. The chipcard can only be used for accessing services when it is activated.

This activation process can be cumbersome and susceptible to security issues.

SUMMARY

It may be seen as an object to improve the process of activating a chipcard, in particular by reducing the complexity for a card holder and increasing the security of the activation process. This object is solved by the subject matter of the independent claims.

A method and a personal device according to the features of the independent claims are provided. Further developments can be derived from the dependent claims and from the following description.

Many of the features described with reference to the method may be implemented as functions of the personal device, or vice versa. Therefore, the description provided in the context of the method applies in an analogous manner also to the personal device. In particular, the method steps may be implemented as functions of the personal device and/or its components, and the functions described with reference to the personal device and/or its components may be implemented as steps of the method.

According to an aspect, a method for activating a chipcard includes the following steps: assigning a unique identifier to the chipcard; assigning the unique identifier to a chipcard record assigned to a designated holder of the chipcard; detecting the unique identifier by a personal device of the designated holder of the chipcard; sending, by the personal device, an activation request for activating the chipcard to an activation server; sending, by the activation server, an activation information and request to a chipcard issuer server; activating, by the chipcard issuer server, the chipcard; sending, by the chipcard issuer server, an activation response to the activation server; and sending, by the activation server, an activation confirmation to the personal device.

A chipcard may be any personalized card, bank card, credit card, identity document, smartcard, SIM-card (subscriber identity module card for mobile communication) that is used to grant (or deny) a person access to information and/or services of a service provider. The chipcard typically includes electronic circuitry including a processor and a memory as well as a communication interface to exchange data with a card reader device. The chipcard may also include an arrangement for receiving energy in a wireless manner for operating the electronic circuitry. The memory may contain information and or certificates, for example, that is used to identify the card holder to a service provider.

The unique identifier can be stored in an electronic circuit, like a tag. For example, the unique identifier is a MAC-address (media access control address) of the tag. Alternatively the unique identifier can be a unique advertisement ID programmed in the tag. The tag may be physically connected to the chipcard in a direct or indirect manner. That means that the tag can be attached to the chipcard or to a package that includes the chipcard. For example, the tag may be operable in accordance with the Bluetooth Low Energy (BLE) protocol. Depending on the configuration and technical functionality of the personal device, the tag may also be or include an RFID-chip (radio frequency identification chip).

The chipcard record is a piece of information indicating a data set that belongs to the designated holder of the chipcard. For example, the chipcard record may be a chipcard account id, a bank account number, a mobile phone number, or any other number that is assigned to the chipcard holder.

When assigning the unique identifier of the tag to the chipcard record assigned to the designated holder of the chipcard, these may be linked to each other and stored in a storage device in such a manner to indicate that said unique identifier relates to said chipcard record. In other words, a link between the unique identifier and the chipcard record is created and stored so that, when performing the steps of the method in accordance with an embodiment, it can be verified if the chipcard is activated by the authorized card holder.

For sending the requests and responses between the personal device, the activation server, and the chipcard issuer server, any data transmission protocol and security mechanisms for securing the exchanged data and messages may be used. Standardized or proprietary protocols may be used for this data exchange. The same applies to the data exchange between the personal device and the tag assigned to the chipcard.

The activation server may implement a service that verifies if the chipcard is sent to the designated card holder. Generally, the activation server provides personalization services.

The chipcard issuer server may implement a service that grants access to provided services to a card holder who proves the authorization for accessing the services by the chipcard, preferably in combination with a password.

The personal device may be a smartphone, a tablet, or any other computerized device that is typically assigned to an individual person. The personal device typically has limited access by that individual person. Thus, one can assume that the person having the personal device and being able to access the applications on the personal device is the one authorized to access the personal device. Optionally, when the personal device sends the activation request, it sends additional information to the activation server like geo-location, device type, IP address, and/or timestamp, in order to further validate the legitimacy of the request for activation of the chipcard.

Preferably, the exchange of messages and/or data between the personal device, the activation server, the chipcard issuer server, and/or the storage device referred to below may be secured by using security protocols such as encryption and keys of any known and suitable or required type.

According to an embodiment, the sending, by the personal device, the activation request for activating the chipcard to the activation server includes sending the detected unique identifier of the chipcard and the chipcard record assigned to the designated holder of the chipcard.

The personal device may have installed an application which includes information about the holder of the chipcard and also the chipcard record. When the personal device detects the unique identifier of the chipcard in its vicinity, the personal device sends the chipcard record and/or infor-mation about the holder of the chipcard together with the unique identifier of the chipcard to the activation server in order to continue the activation process.

According to a further embodiment, the method further includes, after sending, by the personal device, the activa-tion request for activating the chipcard to the activation server and before sending, by the activation server, the activation information and request to a chipcard issuer server: sending, by the activation server, a verification request to a storage device which includes at least one of the chipcard record assigned to the designated holder of the chipcard and the unique identifier of the chipcard.

Thus, before the activation server sends the activation information and request to the chipcard issuer server, the activation server verifies if the unique identifier of the chipcard is assigned to the chipcard record of the card holder who has initiated the activation process. For example, the chipcard record may indicate a bank account number or any other identification number of a card holder that is assigned to the unique identifier of the tag.

When the personal device sends the activation request to the activation server, the personal device also sends the chipcard record and the unique identifier of the tag with this request to the activation server. With this information, the activation server is able to verify if the activation request is sent by a personal device of an authorized card holder.

For example, it is conceivable that the activation server forwards only one of the chipcard record and the unique identifier of the tag to the storage device and the storage device sends back the other one of the chipcard record and the unique identifier of the tag to the activation server. The activation server checks if the data sent back by the storage device corresponds to the data sent by the personal device. If so, the activation server sends the activation information and request to the chipcard issuer server. Otherwise, the activation process is stopped.

Alternatively, it is conceivable that the activation server sends the chipcard record and the unique identifier of the tag to the storage device and the storage device verifies if these are assigned to each other. If so, the storage device sends a verification response to the activation server indicating that the request is valid. Otherwise, the storage device does not respond to the verification request or send an error message to the activation server and the activation of the chipcard is stopped.

According to a further embodiment, the method further includes receiving, by the activation server, a verification response from the storage device; verifying, by the activa-tion server, if the unique identifier of the chipcard sent by the personal device is identical to the unique identifier assigned to the chipcard record.

The verification response sent by the storage device to the activation server may include one or both of the chipcard record and the unique identifier and the activation server verifies if the data included in the verification response corresponds to the data sent by the personal device in the activation request.

For example, the activation server verifies if the unique identifier sent by the personal device is identical to the unique identifier stored in the storage device and is assigned to the chipcard record linked with the designated card holder.

According to a further embodiment, the activation server sends the activation information and request to the chipcard issuer server only if the unique identifier of the chipcard sent by the personal device is identical to the unique identifier assigned to the chipcard record.

According to a further embodiment, the step of assigning the unique identifier to the chipcard includes attaching a tag including the unique identifier to a package of the chipcard.

The tag may include an electronic circuit that is config-ured to receive and send data in a wireless manner. Thus, the personal device can detect the tag and can request data from the tag. The tag includes the unique identifier and sends it to the personal device. The personal device includes an appli-cation which has a data set that is assigned to the owner of the personal device or to a service to which the application grants access. The data set of the application may corre-spond to the chipcard record. In this manner, the personal device links the unique identifier of the tag to the chipcard record that is assigned to the card holder (which typically is identical to the owner of the personal device) and it can be verified in the activation process if the chipcard is requested to be activated by an authorized device and/or card holder.

According to a further embodiment, the step of detecting the unique identifier by the personal device is executed by using wireless data exchange protocols.

For example, the personal device may be equipped with a transmitting and receiving antenna which is configured to exchange data according to the Bluetooth Low Energy (BLE) protocol. A communication interface of the personal device may be activated at predetermined times and send request messages. When a chipcard with a tag is in the vicinity of the personal device, the tag sends a response message including the unique identifier and the personal device can initiate the steps of the activation process.

According to a further embodiment, the method further includes the step of notifying a user of the personal device about detecting the unique identifier assigned to the chipcard and requesting the user to confirm sending the activation request to the activation server.

Thus, when the personal device detects a tag with a unique identifier assigned to a chipcard, the application running on the personal device presents a notification to the user that a chipcard was detected. The personal device also requests the user for a confirmation for sending the activa-tion request to the activation server. In other words, it is still the user who decides about the activation of the chipcard. However, the method as described herein simplifies the activation process and increases the security since the required data for activating the chipcard are automatically sent between the participating entities (tag, personal device, activation server, storage device, chipcard issuer server) and the user is only required to confirm that the activation process is started.

According to a further embodiment, the method further includes the step of determining, by the personal device, a position of the personal device when the unique identifier is detected, and sending the position of the personal device with the activation request to the activation server.

The personal device determines its position when it detects the unique identifier and sends the position information to the activation server along with the activation request. With the position of the personal device, it can be determined if the personal device is located at or close to (and/or within a predetermined distance to) the place of the designated card holder.

The personal device may include a positioning determining device, like a global position system sensor (GPS sensor) or any other positioning sensor using a reference system. For example, when the personal device is a smartphone, it typically includes an integrated GPS sensor which can be used to determine the position of the personal device.

According to a further embodiment, the method further includes the step of determining a distance between the position of the personal device and a registered address of the designated card holder.

The address of the designated card holder may be stored in the storage device and may be compared to the position of the personal device when it detects the unique identifier. The distance between the position of the personal device and the registered address of the designated card holder is a distance in a geographic coordinate system This may increase the security of the activation process.

According to a further embodiment, the chipcard issuer server activates the chipcard only when the distance between the position of the personal device and the registered address of the designated card holder is below a predetermined threshold value.

By comparing the position of the personal device when detecting the unique identifier with the registered address of the designated card holder, an additional security mechanism is implemented in order to make sure that the activation process can only be completed when the personal device is located at or close to the registered address of the designated card holder.

According to a further aspect, a personal device is configured to initiate an activation process for activating a chipcard. The personal device comprises a display, a processor, and a communication interface. The processor is configured to control the communication interface in a manner to send a request message to a tag assigned to the chipcard. The communication interface is configured to receive a response message from the tag, wherein the response message includes a unique identifier of the tag. The processor is configured to create an activation request, wherein the activation request includes the unique identifier and a chipcard record assigned to a designated holder of the chipcard. The processor is configured to create a notification for activating the chipcard, and instruct the display to display the notification to a user of the personal device. The processor is configured to send the activation request to an activation server upon confirmation of the notification and initiate an activation process of the chipcard.

The personal device described herein initiates and participates in the activation method described above. Therefore, in regard to details of the activation process, reference is made to the details of the method.

The personal device may be a smartphone or a tablet and includes, in one example, a processor, a display, a memory, a communication interface, and a position determining unit. Applications are stored in the memory and the processor is configured to execute the instructions which define the applications. The processor controls the display and the communication interface. The display may be a touch sensitive display configured to display information to a user and receive input commands from the user. The communication interface may be configured to exchange data with multiple other devices in a wireless manner, thereby utilizing different communication protocols.

The personal device as described herein may include an application which is assigned to a service of a service provider, like a bank account of a bank. This bank account is identified by a chipcard record and the chipcard record is assigned to the unique identifier of the chipcard. In other words, the chipcard is assigned to the bank account of a designated card holder. In order to be able to activate the chipcard, the unique identifier of the tag is assigned to the chipcard record which is assigned to the holder of the chipcard. This information is stored in the storage device. Now, when the chipcard is shipped to the designated card holder and is close to the personal device, the communication interface of the personal device is able to detect the presence of the tag and get the unique identifier of the tag. The personal device sends the request message. When the request message is received by the tag, the tag sends a response message which is received by the communication interface and the unique identifier can be processed by the personal device in the activation process of the chipcard.

With the unique identifier of the tag and the chipcard record, which is typically assigned to an application in the memory of the personal device, the activation process can be initiated. Upon confirmation by the user, the chipcard record and the unique identifier of the tag are sent to an activation server with the activation request and the activation process is initiated thereby. The activation process corresponds to what is described above with reference to the method.

According to an embodiment, the personal device is configured to execute an application of a service provider, and the application of the service provider is configured to send the request message to the tag assigned to the chipcard.

According to a further embodiment, the application is configured to receive, via the communication interface, a trigger message when a chipcard with a tag is sent to the designated card holder.

There is no need to permanently send request messages to a chipcard tag since this process requires some energy and may impact energy consumption of the personal device.

According to an embodiment, the processor is configured to control the communication interface in a manner to repeatedly send a request message for detecting a tag with a unique identifier for a predetermined period of time.

For example, the personal device may send the request message for a few days. The request message may be sent at regular or irregular intervals. In particular, when the application receives a trigger message that a chipcard was shipped to the designated card holder, the application may initiate repeatedly sending of the request message. When the chipcard has arrived at the designated card holder, the personal device may detect the presence of the tag assigned to the chipcard and the activation process is initiated.

Once the activation process is successfully completed or stopped for any reason, the application may stop sending request messages. When the activation process has failed, the chipcard may not be activated in the manner described herein. However, upon separate request and when corresponding a predetermined security policy, the chipcard issuer may restart the activation mechanism and the personal device is put in a condition where it sends the request message, and the activation process can be initiated as described herein.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
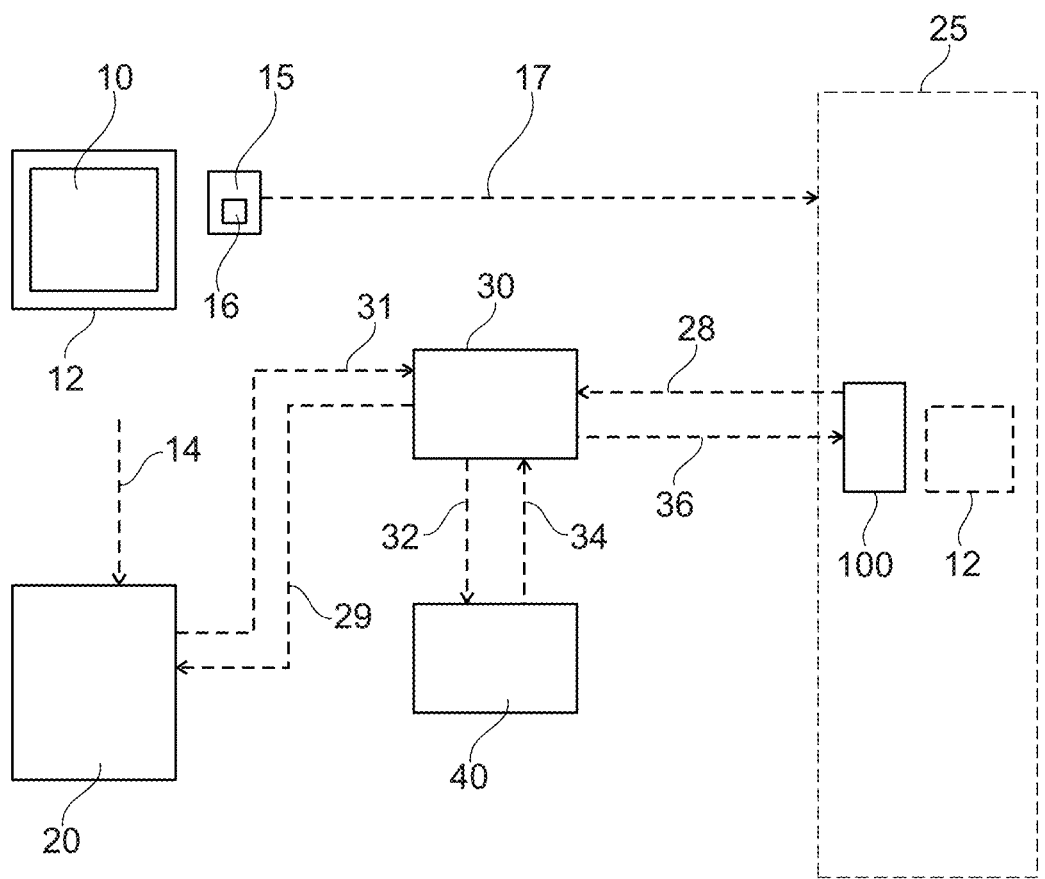
FIG. 1 schematically describes the activation process of a chipcard.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows an activation process of a chipcard 10. The chipcard 10 is boxed in a package 12. A tag 15 with a unique identifier 16 is assigned to the chipcard 10 by attaching the tag 15 to the package 12, e.g., to an inside of the package 12. The tag 15 may be a BLE tag. The unique identifier 16 may be a MAC address of the tag 15. The unique identifier 16 and a card record of the chipcard 10 are assigned to each other and stored to the storage device 20 by sending a message 12 to the storage device 20. The storage device 20 may be a data processing server that is accessible via a data network to receive and provide data.

Once the tag 15 is attached to the chipcard 10 and/or the package 12 and the unique identifier 16 is assigned to the card record and stored in the storage device, the package 12 with the chipcard 10 is shipped to the card holder's address 25, as indicated by the dashed line 17.

When the package 12 with the tag 15 is close to a personal device 100 of the card holder, the personal device 100 detects the presence of the tag 15 and is able to read out the unique identifier 16. The personal device 100 is configured to initiate the activation process when the tag 15 is detected.

The personal device 100 may include an application that runs a scanning process (e.g., Bluetooth scan) to detect the tag 15. Once the package 12 is in the scanning range of the personal device 100, a notification is popped up on the personal device 100 asking a user of the personal device 100 to activate the chipcard 10.

Then the user confirms that the activation process starts, the personal device 100 sends an activation request 28 to the activation server 30. The activation server 30 may be a cloud service operated by the chipcard manufacturer. The activation request 28 includes the unique identifier 16 of the tag 15 and also a record indicating the card holder or an instance of the application running on the personal device 100.

Subsequently, the activation server 30 sends a verification request 29 to the storage device 20. The verification request 29 serves the purpose to verify if the activation process of the chipcard 10 identified by the unique identifier 16 was initiated by the authorized card holder. For example, the activation server 30 may request the entry from the storage device 20 including the unique identifier, and this data is sent by the storage device 20 to the activation server 30 in a verification response 31. The activation server 30 verifies if the unique identifier and the card record sent in the activation request 28 are identical to those stored in the storage device and assigned to each other and sent in the verification response 31.

Given that the unique identifier of the tag 16 and the card record correspond to each other, the authentication process is continued. The activation server 30 sends an activation information and request 32 to the chipcard issuer server 40, thereby informing the chipcard issuer that the chipcard 10 has arrived at the designated card holder and the activation requirements are met.

Now, the chipcard issuer server 40 activates the chipcard 10 and the chipcard 10 can be used to access services. The chipcard issuer server 40 sends an activation response 34 to the activation server 30 which then sends an activation confirmation 36 to the personal device 100. The personal device 100 may indicate successful activation to the card holder by a signal like a message on the display of the personal device or by an acoustic message.

Figure 2:
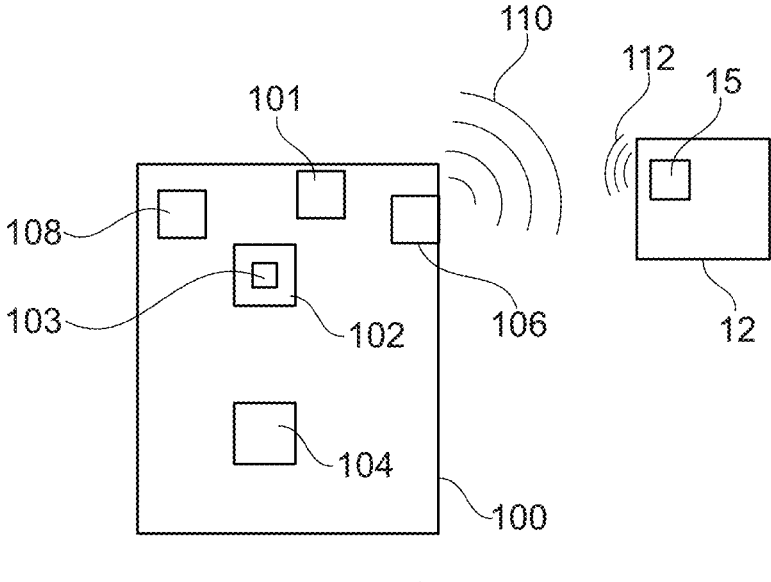
FIG. 2 is a schematic representation of a personal device that is configured to participate in an activation process of a chipcard.

FIG. 2 shows an example of the personal device 100 already referred to in FIG. 1. The personal device 100 comprises a display 101, a processor 102 running an application 103, a memory 104, a communication interface 106 (like one or more antennas for sending and receiving signals), and a position determining unit 108 (like a GPS unit).

When the application 103 is put in a condition to expect a new chipcard to be sent to a user, the application executes commands to instruct the communication interface 106 to send a request message 110 for discovering a tag 15. The request message 110 may be sent repeatedly at regular or irregular intervals.

For example, the activation server 30 or the chipcard issuer server 40 may send a message to the application 103 running on the personal device 100 that a new chipcard 10 was shipped to the card holder (which is identical to the user of the personal device 100). Once the personal device 100 has received such a message, it starts sending the request message 110 after a predetermined time, for example after an expected shipping time.

Furthermore, the personal device may be configured such that it sends the request message only at certain daytimes. For example, during daylight time, the request message 110 may be sent every 2 hours. During the night, no request message 110 may be sent, or it may be sent at different intervals.

When the package 12 with the tag 15 is in a certain range of the personal device 100, the tag 15 responds to the request message 110 with a response message 112. The response message includes at least the unique identifier 16.

The car record may be stored in the memory 104 of the personal device 100 and assigned to the application 103. The personal device 100, i.e., the application 103, can now create the activation request 28 (see FIG. 1) based on the unique identifier of the tag and the card record and send the activation request 28 to the activation server, as described with reference to FIG. 1.

The personal device 100 may also determine its geo-position with the position determining unit 108 and add the geo-position to the activation request so that the activation server 30 is able to verify if the activation process was initiated from a place within a certain distance of the registered address of the card holder.

The application 103 may include one or more modules which execute different functions. For example, one module may be configured to receive information from the activation server 30 that a new chipcard was shipped to the card holder. Another module may be configured to manage the discovery process of the tag 15, i.e., sending the request message 110 and receiving the response message 112. Another module may be configured to communicate with the activation server 30, i.e., manage the activation request and the activation confirmation 36. However, these functions may alternatively be implemented in the same application which grants access to a service of the chipcard issuer, like a banking application running on the smartphone.

Figure 3:
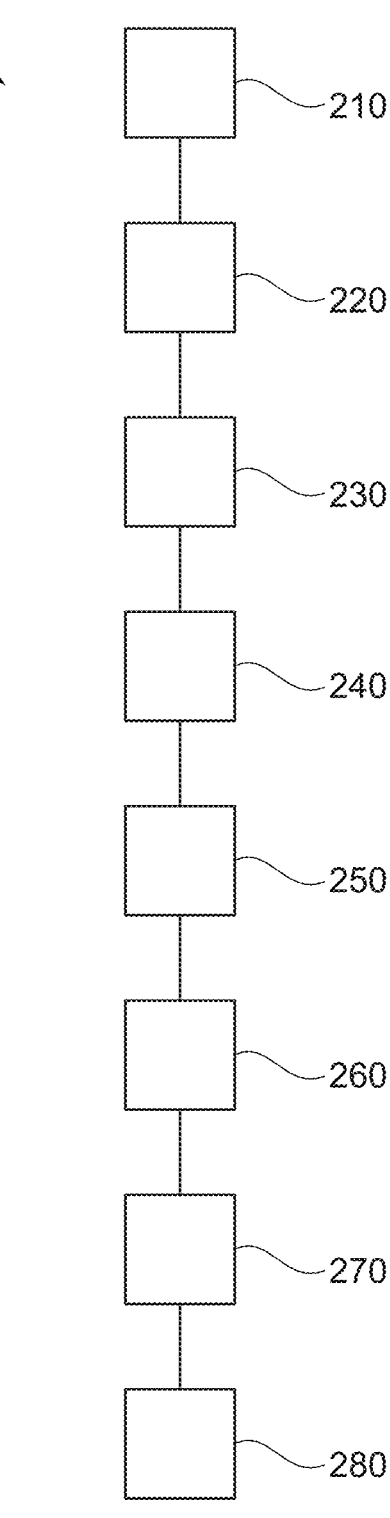
FIG. 3 schematically shows the steps of a method for activating a chipcard.

With reference to FIG. 1, FIG. 3 schematically shows the steps of a method 200 for activating a chipcard 10. The method comprises the steps: in one step 210, assigning a unique identifier 16 to the chipcard 10; in another step 220, assigning the unique identifier 16 to a chipcard record assigned to a designated holder of the chipcard 10; in another step 230, detecting the unique identifier 16 by a personal device 100 of the designated holder of the chipcard 10; in another step 240, sending, by the personal device 100, an activation request 28 for activating the chipcard 10 to an activation server 30; in another step 250, sending, by the activation server 30, an activation information and request 32 to a chipcard issuer server 40; in another step 260, activating, by the chipcard issuer server 40, the chipcard 10; in another step 270, sending, by the chipcard issuer server 40, an activation response 34 to the activation server 30; and in another step 280, sending, by the activation server 30, an activation confirmation 36 to the personal device 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above.

It is claimed:

1. A method for activating a chipcard with a personal device of a designated holder of the chipcard, the method comprising:

assigning a unique identifier to the chipcard;

assigning the unique identifier to a chipcard record assigned to a designated holder of the chipcard, wherein the personal device has installed an application which includes information about the designated holder of the chipcard and the chipcard record;

detecting the unique identifier by the personal device of the designated holder;

sending, by the personal device, an activation request for activating the chipcard to an activation server, wherein the sending, by the personal device, the activation request for activating the chipcard to the activation server includes sending the detected unique identifier of the chipcard and the chipcard record assigned to the designated holder of the chipcard;

sending, by the activation server, an activation information and request to a chipcard issuer server;

activating, by the chipcard issuer server, the chipcard;

sending, by the chipcard issuer server, an activation response to the activation server; and sending, by the activation server, an activation confirmation to the personal device.

2. The method of claim 1, wherein the method further comprising:

after sending, by the personal device, the activation request for activating the chipcard to the activation server and before sending, by the activation server, the activation information and request to a chipcard issuer server;

sending, by the activation server, a verification request to a storage device which includes at least one of the chipcard record assigned to the designated holder of the chipcard and the unique identifier of the chipcard.

3. The method of claim 2, further comprising:

receiving, by the activation server, a verification response from the storage device;

verifying, by the activation server, if the unique identifier of the chipcard sent by the personal device is identical to the unique identifier assigned to the chipcard record.

4. The method of claim 3, wherein the activation server sends the activation information and request to the chipcard issuer server only if the unique identifier of the chipcard sent by the personal device is identical to the unique identifier assigned to the chipcard record.

5. The method of claim 4, wherein the assigning the unique identifier to the chipcard includes attaching a tag including the unique identifier to a package of the chipcard.

6. The method of claim 5, wherein the detecting the unique identifier by the personal device is executed by using wireless data exchange protocols.

7. The method of claim 6, wherein the method further includes notifying a user of the personal device about detecting the unique identifier assigned to the chipcard and requesting the user to confirm sending the activation request to the activation server.

8. The method of claim 7, wherein the method further comprising determining, by the personal device, a position of the personal device when the unique identifier is detected, and sending the position of the personal device with the activation request to the activation server.

9. The method of claim 8, wherein the method further comprising determining a distance between the position of the personal device and a registered address of the designated card holder.

10. The method of claim 9, wherein the chipcard issuer server activates the chipcard only when the distance between the position of the personal device and the registered address of the designated card holder is below a predetermined threshold value.

11. A personal device, configured to initiate an activation process for activating a chipcard, the personal device comprising:

a display;

a processor;

a communication interface;

a memory having stored an application which includes information about a designated holder of the chipcard and a chipcard record assigned to the designated holder of the chipcard;

wherein the processor is configured to control the communication interface in a manner to send a request message to a tag assigned to the chipcard;

wherein the communication interface is configured to receive a response message from the tag, wherein the response message includes a unique identifier of the tag;

wherein the processor is configured to create an activation request, wherein the activation request includes the unique identifier and the chipcard record;

wherein the processor is configured to create a notification for activating the chipcard and instruct the display to display the notification to a user of the personal device;

wherein, upon confirmation of the notification, the processor is configured to send the activation request to an activation server and initiate an activation process of the chipcard, wherein sending the activation request to the activation server includes sending the detected unique identifier of the chipcard and the chipcard record assigned to the designated holder of the chipcard.

12. The personal device of claim 11, wherein the personal device is configured to execute an application of a service provider, and the application of the service provider is configured to send the request message to the tag assigned to the chipcard.

13. The personal device of claim 12, wherein the application is configured to receive, via the communication interface, a trigger message when a chipcard with a tag is sent to the designated card holder.

14. The personal device of claim 13, wherein the processor is configured to control the communication interface in a manner to repeatedly send a request message for detecting a tag with a unique identifier for a predetermined period of time.

\* \* \* \* \*